US012792227B2

(12) United States Patent
Lien et al.

(10) Patent No.: US 12,792,227 B2
(45) Date of Patent: Nov. 10, 2026

(54) MANAGING AN ORDER OF PROGRAMMING OPERATIONS IN A MEMORY SUB-SYSTEM

(71) Applicant: Micron Technology, Inc., Boise, ID (US)

(72) Inventors: Yu-Chung Lien, San Jose, CA (US); Huai-Yuan Tseng, San Ramon, CA (US); Tomer Tzvi Eliash, Sunnyvale, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 86 days.

(21) Appl. No.: 18/779,926

(22) Filed: Jul. 22, 2024

(65) Prior Publication Data

US 2025/0085863 A1 Mar. 13, 2025

Related U.S. Application Data

(60) Provisional application No. 63/629,950, filed on Sep. 13, 2023.

(51) Int. Cl.
*G06F 3/06* (2006.01)

(52) U.S. Cl.
CPC .......... *G06F 3/0619* (2013.01); *G06F 3/0659* (2013.01); *G06F 3/0673* (2013.01)

(58) Field of Classification Search
CPC ..... G06F 3/0619; G06F 3/0659; G06F 3/0673
See application file for complete search history.

(56) References Cited

U.S. PATENT DOCUMENTS

| | | | | |
|---|---|---|---|---|
| 2005/0219896 | A1* | 10/2005 | Chen | G11C 16/3459 365/185.03 |
| 2020/0142637 | A1* | 5/2020 | Park | G11C 16/3495 |
| 2021/0280261 | A1* | 9/2021 | Yang | G06F 3/0679 |

* cited by examiner

*Primary Examiner* — Xiaochun L Chen
(74) *Attorney, Agent, or Firm* — Lowenstein Sandler LLP

(57) ABSTRACT

A processing device, operatively coupled with a memory device, receives a request to perform a programming operation on a first set of cells addressable by a first wordline of a first die of the memory device. The processing device identifies a programming order associated with the first wordline. The processing device adjusts, based on the programming order, a biasing scheme associated with the first wordline. The processing device further performs, using the programming order and biasing scheme, the programming operation on the first set of cells addressable by the first wordline.

18 Claims, 5 Drawing Sheets

MANAGING AN ORDER OF PROGRAMMING OPERATIONS IN A MEMORY SUB-SYSTEM

REFERENCE TO RELATED APPLICATIONS

This application claims the priority benefit of U.S. Provisional Application No. 63/629,950, filed Sep. 13, 2023, which is incorporated by reference herein.

TECHNICAL FIELD

Embodiments of the disclosure relate generally to memory sub-systems, and more specifically, relate to managing an order of programming operations in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
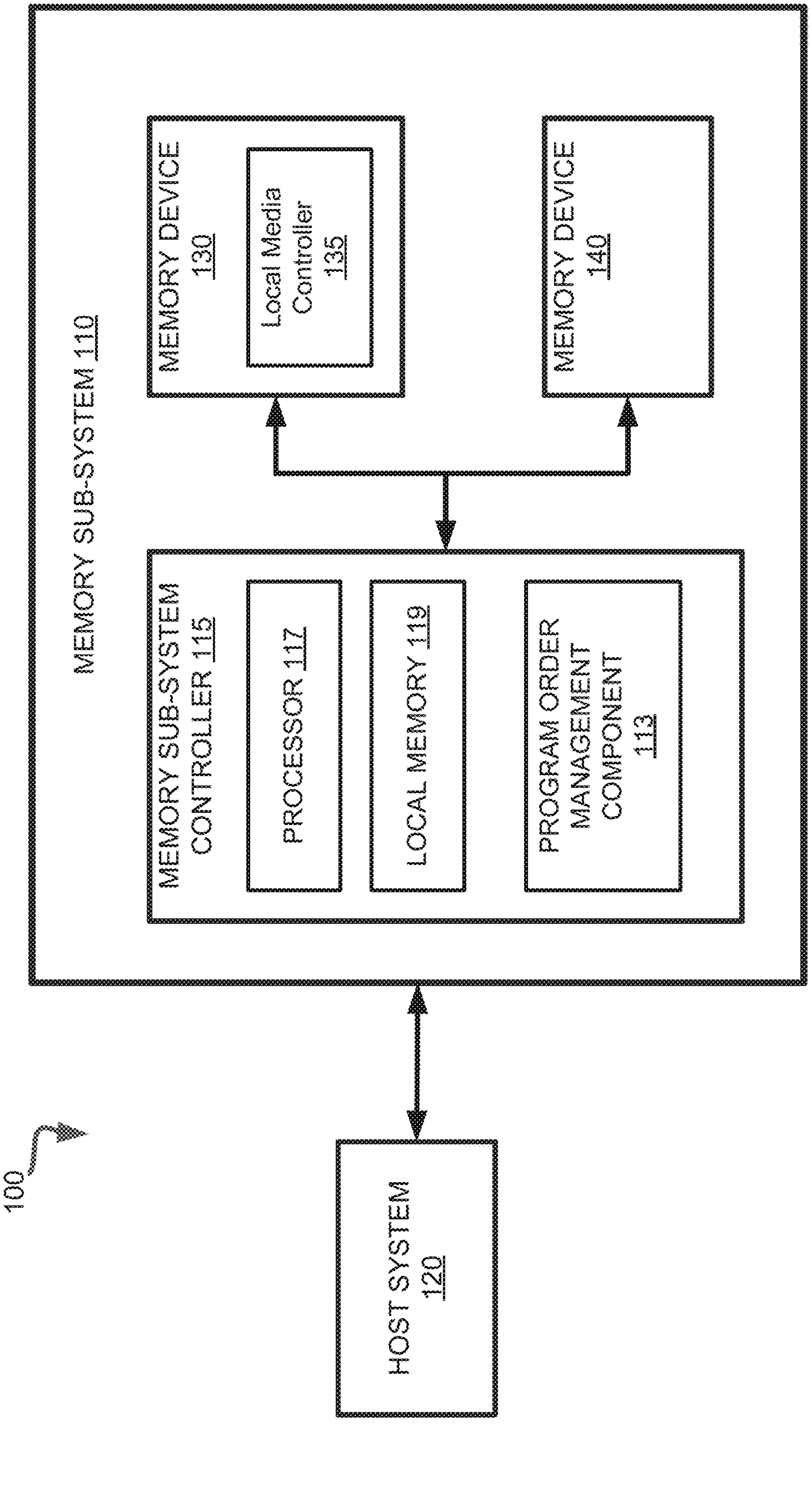
FIG. 1 illustrates an example computing system that includes a memory sub-system, in accordance with some embodiments of the present disclosure.

Aspects of the present disclosure are directed to managing an order of programming operations in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die includes one or more planes. For some types of non-volatile memory devices (e.g., NAND devices), each plane includes a set of physical blocks. Each block includes a set of pages. Each page includes a set of memory cells. A memory cell is an electronic circuit that stores information. Depending on the memory cell type, a memory cell can store one or more bits of binary information and has various logic states that correlate to the number of bits being stored. The logic states can be represented by binary values, such as “0” and “1”, or combinations of such values.

A memory device can include multiple memory cells arranged in a two-dimensional or three-dimensional grid. Memory cells are formed onto a silicon wafer in an array of columns and rows. A memory device can further include conductive lines connected to respective ones of the memory cells, referred to as wordlines and bitlines. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

A memory cell (“cell”) can be programmed (written to) by applying a certain voltage to the cell, which results in an electric charge being held by the cell. For example, a voltage signal $V_{CG}$ that can be applied to a control electrode of the cell to open the cell to the flow of electric current across the cell, between a source electrode and a drain electrode. More specifically, for each individual cell (having a charge Q stored thereon) there can be a threshold control gate voltage $V_T$ (also referred to as the “threshold voltage”) such that the source-drain electric current is low for the control gate voltage ($V_{CG}$) being below the threshold voltage, $V_{CG}<V_T$. The current increases substantially once the control gate voltage has exceeded the threshold voltage, $V_{CG}>V_T$. Because the actual geometry of the electrodes and gates varies from cell to cell, the threshold voltages can be different even for cells implemented on the same die. The cells can, therefore, be characterized by a distribution P of the threshold voltages, $P(Q, V_T)=dW/dV_T$, where dW represents the probability that any given cell has its threshold voltage within the interval $[V_T, V_T+dV_T]$ when charge Q is placed on the cell.

A memory device can exhibit threshold voltage distributions $P(Q_k, V_T)$ that are narrow compared with the working range of control voltages tolerated by the cells of the device. Accordingly, multiple non-overlapping distributions $P(Q_k, V_T)$ (“valleys”) can be fit into the working range allowing for storage and reliable detection of multiple values of the charge $Q_k$, k=1, 2, 3 . . . . The distributions (valleys) are interspersed with voltage intervals (“valley margins”) where none (or very few) of the cells of the device have their threshold voltages. Such valley margins can, therefore, be used to separate various charge states $Q_k$. The logical state of the cell can be determined by detecting, during a read operation, between which two valley margins the respective threshold voltage $V_T$ of the cell resides. Specifically, the read operation can be performed by comparing the measured threshold voltage $V_T$ exhibited by the memory cell to one or more reference voltage levels corresponding to known valley margins (e.g., centers of the margins) of the memory device.

One type of cell is a single level cell (SLC), which stores 1 bit per cell and defines 2 logical states ("states") ("1" or "L0" and "0" or "L1") each corresponding to a respective $V_T$ level. For example, the "1" state can be an erased state and the "0" state can be a programmed state (L1). Another type of cell is a multi-level cell (MLC), which stores 2 bits per cell and defines 4 states ("11" or "L0", "10" or "L1", "01" or "L2" and "00" or "L3") each corresponding to a respective $V_T$level. For example, the "11" state can be an erased state and the "01", "10" and "00" states can each be a respective programmed state. Another type of cell is a triple level cell (TLC), which stores 3 bits per cell and defines 8 states ("111" or "L0", "110" or "L1", "101" or "L2", "100" or "L3", "011" or "L4", "010" or "L5", "001" or "L6", and "000" or "L7") each corresponding to a respective $V_T$ level. For example, the "111" state can be an erased state and each of the other states can be a respective programmed state. Another type of a cell is a quad-level cell (QLC), which stores 4 bits per cell and defines 16 states L0-L15, where L0 corresponds to "1111" and L15 corresponds to "0000". Another type of cell is a penta-level cell (PLC), which stores 5 bits per cell and defines 32 states. Other types of cells are also contemplated. Thus, an n-level cell can use $2^n$ levels of charge to store n bits. A memory device can include one or more arrays of memory cells such as SLCs, MLCs, TLCs, QLCs, PLCs, etc. or any combination of such. For example, a memory device can include an SLC portion, and an MLC portion, a TLC portion, a QLC portion, or a PLC portion of cells.

A valley margin can also be referred to as a read window. For example, in a SLC cell, there is 1 read window that exists with respect to the 2 $V_t$ distributions. As another example, in an MLC cell, there are 3 read windows that exist with respect to the 4 $V_t$ distributions. As yet another example, in a TLC cell, there are 7 read windows that exist with respect to the 8 $V_t$ distributions. Read window size generally decreases as the number of states increases. For example, the 1 read window for the SLC cell may be larger than each of the 3 read windows for the MLC cell, and each of the 3 read windows for the MLC cell may be larger than each of the 7 read windows for the TLC cell, etc. Read window budget (RWB) refers to the cumulative value of the read windows. RWB degradation can negatively affect memory device reliability. For example, RWB degradation can lead to an increase in the number of errors (e.g., bit errors) and/or error rate (e.g., bit error rate (BER)).

Certain memory cells of certain wordlines can inherently have differing read window budgets (RWBs) and thus differing memory device reliability than other memory cells of other wordlines. The difference in RWB from wordline to wordline, and cell to cell, can be caused by variability in manufacturing processes, e.g., etching processes, etc. In certain memory devices, a cross temperature effect on memory devices can also have a significant impact on memory device reliability among wordlines. The cross-temperature effect can occur at extreme temperatures of the memory device, such as at temperatures above 60 degrees Celsius and temperatures below 10 degrees Celsius. In certain memory devices, data degradation can be measured in terms of a number of errors (e.g., bit errors) and/or error rate (e.g., using a raw bit error rate (RBER)). When performing programming operations on memory cells of wordlines with high RBERs (e.g., the RBER is greater than or equal to an RBER threshold criterion), there can be an increase in latency (and decrease in system performance) due to an additional step of performing an ECC decoding operation to correct errors in the data stored in the memory cells. In contrast, if the RBER is low (e.g., the RBER is lower than the RBER threshold criterion), no additional ECC decoding operation is performed, avoiding a decrease in system performance.

Programming operations can be performed by the memory sub-system. The programming operations can be host-initiated operations. For example, the host system can initiate a programming operation (e.g., write, read, erase, etc.) on a memory sub-system. The host system can send access requests (e.g., write commands, read commands) to the memory sub-system, such as to store data on a memory device of the memory sub-system or to read data from the memory device of the memory sub-system. The data to be read or written, as specified by a host request, is hereinafter referred to as "host data." A host request can include a logical address (e.g., a logical block address (LBA) and namespace) for the host data, which is an identifier that the host system associates with the host data. The logical address information (e.g., LBA, namespace) can be part of metadata for the host data. Metadata can also include error handling data (e.g., ECC codeword, parity code), a data version (e.g., used to distinguish age of data written), a valid bitmap (specifying which LBAs contain valid data), etc. In order to isolate from the host system various aspects of physical implementations of memory devices employed by memory sub-system, the memory sub-system controller can maintain a data structure that maps each LBA to a corresponding physical address (PA). For example, for flash memory, the physical address can include the channel identifier, die identifier, page identifier, plane identifier and/or frame identifier. The mapping data structure is referred to herein as a logical-to-physical (L2P) table. The L2P table can be segmented into multiple sections. Each section can have a number of regions, and each region can include a number of mapping entries. The L2P table is maintained by the firmware of the memory sub-system controller and is stored on one or more non-volatile memory devices of the memory sub-system.

In certain memory devices, in order to simplify L2P tables and reduce system overhead when performing programming operations, a memory sub-system controller can logically group similarly located blocks across planes of multiple dice into one block (i.e., a virtual block) to perform concurrent programming operations. Similarly located blocks can be blocks at similar physical locations (e.g., along the same wordline and/or blocks with the same or similar physical addresses) in each die, as described in more detail below. The memory sub-system controller can address the virtual block using a single logical block address. For example, the memory sub-system controller can map the virtual block to a "logical block address 1" in the L2P table. The memory sub-system controller can thus use the same logical block address of the virtual block to perform concurrent programming operations on blocks at similar physical locations (e.g., along the same wordline) across each die. The memory sub-system controller can also perform programming operations in the same programming order across each die, such as in a source-to-drain programming order or a drain-to-source programming order (e.g., from a lower deck to an upper deck or from an upper deck to a lower deck).

However, as described above, certain wordlines have inherently higher RBERs. Therefore, since the logical block address of a virtual block can address blocks at similar physical locations (e.g., along the same wordline) across each die and in the same programming order, there can be cases where the logical block address of a virtual block addresses blocks along wordlines that have inherently higher RBERs. There can thus be an increased risk that a programming operation can be addressed to a logical block address of a virtual block that includes blocks along wordlines with inherently higher RBERs. Performing the programming operation can lead to a degradation in performing read operations due to having to perform additional ECC decoding operations for each wordline of each die due to the higher RBERs. In certain cases, this can also lead to a read timeout, where the amount of time for performing a read operation reaches the time limit the host system sets for performing the read operation. Read timeouts can often lead to system failures due to having to continue performing read operations on wordlines with high RBERs across each die, where performing each read operation results in another read timeout.

Aspects of the present disclosure address the above and other deficiencies by managing the order of programming operations in a memory sub-system to avoid high RBER clusterings among wordlines in each die of a memory device. In some implementations, a memory sub-system controller receives a request to perform a programming operation (e.g., a write operation) on a set of memory cells addressable by a wordline residing on a certain die (e.g., die 0) of a memory device. The memory sub-system controller can identify a programming order of the wordline. For example, the programming order can be a source to drain programming order or a drain to source programming order. A source to drain programming order refers to an order of programming operations in which electric current flows across a memory cell from the source electrode to the drain electrode in a memory device. A drain to source programming order refers to an order of programming operations in which electric current flows across a memory cell from the drain electrode to the source electrode in a memory device. In some implementations, the memory sub-system controller identifies the programming order by retrieving the programming order from a metadata structure, e.g., a look-up table and/or a logical-to-physical (L2P) table. The programming order can be assigned to each wordline by the memory sub-system controller and/or a firmware component during an offline testing phase of the memory device. The programming order can be set according to identified high RBER clusterings among the wordlines of each die and/or based on an error count of each die. For example, the programming order can be set to avoid performing programming operations on sets of cells addressable by wordlines in areas of each die with high RBER clusterings and/or a high error count. In some implementations, in response to identifying the programming order, the memory sub-system controller can adjust a biasing scheme for the wordline to account for any "program disturb" effects that can occur when performing a programming operation on the set of cells addressable by the wordline. In some implementations, adjusting a biasing scheme for the wordline to account for program disturb effects can include performing a "special programming scheme." The special programming scheme can be a "GIDL seed" programming scheme and/or a "wordline (WL) stagger discharge" (WSD) programming scheme, as described in further detail below.

More specifically, in certain memory devices, when performing a programming operation, certain cells can be subject to an effect known as a "programming disturbance" or a "program disturb" effect. During a programming operation, a selected cell(s) can be programmed with the application of a programming voltage to a selected wordline. Due to the wordline being common to multiple cells, unselected cells can be subject to the same programming voltage as the selected cell(s). If not otherwise preconditioned, the unselected cells can experience effects from the programming voltage on the common wordline. These programming voltage effects can include the condition of charge being stored in the unselected cells which are expected to maintain stored data. This programming voltage effect is termed a "programming disturbance" or "program disturb" effect. The program disturb effect can render the charge stored in the unselected cells unreadable altogether or, although still apparently readable, the contents of the cell can be read as a data value different than the intended data value stored before application of the programming voltage.

The presence of residue electrons, such as electrons trapped or otherwise remaining on a charge storage structure after an earlier operation (e.g., a program verify operation), can contribute to the program disturb effect. At the end of a program verify operation, for example, a pass voltage (Vpass) applied to the wordlines that are not being programmed ramps down and word lines on the source side having a high threshold voltage will cut off prior to wordlines with a lower threshold voltage. Therefore, electrons will be trapped in the channel region (e.g., the pillar) of array transistors connected to the wordlines with the lower threshold voltage (e.g., between the cut off wordlines) and become residue electrons. Since the channel region (e.g., the pillar) in some memory devices is a floating channel that may not be connected to a bulk grounded body, there is generally no path for residual electrons in the channel region to discharge other than through towards the source of the memory string. These residue electrons can contribute to program disturb in a number of ways. For example, regular data wordlines (e.g., wordlines lower down the string) can suffer from hot-electron ("hot-e") disturb where a large voltage differential between the gate and source causes the residue electrons to be injected from a drain depletion region into the floating gate. In addition, the top few wordlines in the string might suffer from insufficient boosting when the channel material of unselected cells is at a voltage sufficiently different than the programming voltage. This difference in voltage can initiate an electrostatic field of sufficient magnitude to change the charge on a wordline and cause the contents of the cell to be programmed inadvertently or read incorrectly.

During a programming operation on a memory device, certain phases can be encountered, including program, program recovery, program verify, and program verify recovery. Since relatively high voltages are applied during the program and program verify phases, the program recovery and program verify recovery phases allow the device to recover from the high voltage modes to discharge internal nodes, etc. For example, a high program voltage can be applied during a program phase, followed by a program recovery phase where the nodes are discharged. Then a verify voltage can be applied during a program verify phase, followed by a verify recovery phase. During the recovery phases all signals are ramped down to some lower voltage level. If the duration of the recovery phase is long enough, electron-hole pair generation and recombination occurring inside the polysilicon channel will tend to bring the uneven channel potential due to the residue electrons across the pillar back to a certain level (e.g., 0 volts). During this process, source side residue electrons are recombined with the generated holes and hence the number of remaining residue electrons decreases. A longer program verify recovery phase, however, hurts device performance and introduces undesired latency. If the program verify recovery phase is shortened though, a larger number of residue electrons are retained (e.g., from the program verify operation), leading to increased program disturb.

In certain memory devices, a program refresh operation can be performed with respect to a set of cells addressable by a wordline to reduce the program disturb effects. Performing the program refresh operation can include setting a program pulse. Generally, a program refresh operation described herein can be performed to refresh data stored on cells addressable by (e.g., connected to) a programmed wordline to recover the RWB from an initial point in time. The program refresh operation "touches up" the stored data.

More specifically, the set of cells can be programmed with the program pulse. A local media controller can then initiate a program verify operation with respect to the set of cells. The local media controller can determine whether the set of cells passes the program verify operation. More specifically, during the program verify operation, the local media controller can cause a target bias voltage to be applied to the wordline for sensing the set of cells. From the sensing, the local media controller can determine whether each cell of the set of cells has a higher $V_T$ than the target bias voltage. If so, then each cell of the set of cells has reached the target bias voltage. Otherwise, if the least one cell of the set of cells does not have a higher $V_T$ than the target bias voltage, then a seeding operation can be performed by the local media controller. Generally, the seeding operation involves passing negative charge carriers (e.g., electrons) through at least one seeding path defined by at least one string of cells of a memory array, where each string of cells includes a respective cell of the set of cells that is addressable by a given bitline and source line. For example, the negative charge carriers can be generated during the program verify operation. The negative charge carriers are passed through the string to reach the cell addressable by the selected wordline in an attempt to make the potential of the channel (e.g., pillar) approximately equal to the first bias voltage. To perform the seeding operation, the local media controller can cause a first bias voltage to be applied to the at least one string of cells (via its respective bitline or source line), and a second bias voltage to be applied to other wordlines that exist in the region between the selected wordline and the bitline (or source line). The seeding can be performed using a seeding mask pattern, which can be a random mask pattern.

If non-erased data (e.g., user data) is stored in one or more of the cells of a string addressable by the other wordlines, then the non-erased data can block the seeding path defined by the string. For example, if the seeding mask pattern is a random mask pattern, then at least one seeding path through at least one string of cells may be blocked. A blocked seeding path could result in a collection of the negative charge carriers within the channel. The collection of these negative charge carriers can result in a negative channel voltage that can cause program disturb.

To address the collection of negative charges that can result from a blocked seeding path, the local media controller can cause gate-induced drain leakage (GIDL) (also referred to herein as a "GIDL seed" programming scheme) with respect to the string of cells defining the blocked seeding path. GIDL refers to tunneling-based leakage currents from the drain of a field-effect transistor (FET) due to the (partial) overlap region that exists between the drain and the gate of the FET. The GIDL achieved during the seeding operation can generate a corresponding number of positive charge carriers (e.g., holes) that are supplied into the channel to neutralize the negative charge carriers collected within the blocked seeding path. Accordingly, embodiments described herein can exploit GIDL, which is typically an undesirable phenomenon, to achieve improvements in the memory device.

GIDL can be realized from at least one of the drain-side of the memory array or the source-side of the memory array. To cause GIDL on the drain-side for a string of cells, the local media controller can cause respective bias voltages to be applied to the bitline and a drain-side select gate (SGD) connected to the string of cells. The magnitude of the difference between the bias voltages applied to the bitline and the SGD controls the amount of GIDL that is realized from the drain-side, which controls the number of positive charge carriers that are supplied into the channel from the drain-side to neutralize the negative charge carriers. To cause GIDL on the source-side for a string of cells, the local media controller can cause respective voltage biases to be applied to the source line and a source-side select gate (SGS) connected to the string of cells. The magnitude of the difference between the bias voltages applied to the source line and the SGS controls the amount of GIDL that is realized from the source-side, which controls the number of positive charge carriers that are supplied into the channel from the source-side to neutralize the negative charge carriers.

In certain memory devices, a non-negative bias voltage can be applied to the bitline and/or the source line, and a non-positive bias voltage can be applied to the SGD and/or the SGS. For example, the bias voltage applied to the bitline can range between about 0 volts (V) to about 5 V, the bias voltage applied to the SGD can range between about −5 V to about 0 V. At least a portion of the cells within the string connected to respective wordlines can be grounded (e.g., at about 0 V) to allow for the movement of the positive charge carriers generated by the GIDL through the string. All the cells within the string connected to respective wordlines can be grounded to allow for the movement of positive charge carriers from both the drain-side and the source-side. As mentioned above, the difference between the bias voltages applied to the bitline and SGD and source line and SGS control the number of positive charge carriers that are supplied from drain-side and the source-side, respectively.

Biasing the bitline and/or source line to high voltages (e.g., greater than or equal to 5 V) to cause drain-side GIDL and/or source-side GIDL can result in disturb effects. Examples of disturb effects include erase disturb and/or program disturb. For example, the high positive bias voltage applied to the bitline and/or the source line can cause erase disturb from stress due to the grounding of the cells. As another example, a large potential difference between the high positive bias voltage applied to the bitline and/or the source line and the negative voltage of the channel (e.g., pillar) can lead to program disturb caused by hot electron injection.

At least the above-noted disturb effects can be mitigated by minimizing the magnitude of the non-negative bias voltage applied to the bitline and/or the source line, while maximizing the magnitude of the negative bias voltage applied to the SGD and/or the SGS. For example, a 3.5 V bias voltage applied to the bitline and a −4 V bias voltage applied to the SGD can generate a similar amount of drain-side GIDL as a 5 V bias voltage applied to the bitline and a −2.5 V bias voltage applied to the SGD, while reducing disturb effects. It may be even more beneficial to ground the bitline and/or the source line (e.g., 0 V) and apply an even higher magnitude negative bias voltage to the SGD and/or the SGS.

Due to memory device size and/or design constraints, it may be impractical or impossible in some implementations to apply such high magnitude negative bias voltages to the SGD and/or the SGS. In some memory devices, GIDL can be realized from a single side of the memory array (e.g., drain-side or source-side), depending on the location of the WL selected for a program refresh operation, in a manner that reduces disturb effects (e.g., erase disturb and/or program disturb).

After performing the seeding operation, the local media controller can set a new program pulse. The new program pulse can have a voltage magnitude greater than the previous program pulse used to program the set of cells. For example, the new program pulse can have a voltage magnitude equal to the previous program pulse plus a voltage delta (i.e., the difference between the voltage magnitude of the new program pulse and the voltage magnitude of the previous program pulse is the voltage delta).

In certain memory devices, to address the collection of negative charges that can result from a blocked seeding path, the local media controller can cause wordline (WL) stagger discharge (also referred to herein as a "WSD" programming scheme) with respect to the string of cells defining the blocked seeding path. WSD refers to draining the residue electrons in the channel to prevent program disturb on middle to outer WLs of the memory array after performing a program verify operation and before setting a new program pulse.

Accordingly, managing the order of programming operations in a memory sub-system can result in an overall improved performance of memory devices and an increase in data reliability, while mitigating the effects of program disturb. Instead of using the same wordlines on each die when performing programming operations, the memory sub-system can identify the programming order of the programming operations performed on each die and perform programming operations according to the particular programming orders on each die, thus ensuring that different wordlines can be used when performing programming operations and avoiding high RBER clusterings on each die of a memory device. A program refresh operation can then be performed on cells formed by wordlines already programmed to recover (e.g., improve) RWB after data retention when performing the programming operations. Managing the order of programming operations can avoid cases where using the same wordlines on each die results in using only wordlines with high RBERs. As described above, high RBER/degradation can be seen in similar wordlines of all dice due to the similar physical characteristics of each die. Performing programming operations on wordlines with high RBER can lead to a degradation in performing read operations, thus resulting in a slower system performance due to having to perform additional ECC decoding operations and/or a host timeout. Thus, managing the order of programming operations when performing programming operations on each die can help avoid using wordlines with similar high RBERs among all dice (e.g., high RBER clusterings). This can thus result in an increase in data reliability, an avoidance of a host system timeout, and an improvement in overall system performance.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include not-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In some embodiments, the memory sub-system 110 includes a programming order management component 113 that can be used to perform managing the programming operation order in a memory device 130 or memory device 140. The programming order management component 113 receives a request to perform a programming operation (e.g., a write operation) on a set of memory cells addressable by a wordline residing on a certain die (e.g., die 0) of a memory device. The programming order management component 113 can identify a programming order of the wordline. For example, the programming order can be a source to drain programming order or a drain to source programming order. A source to drain programming order refers to an order of programming operations in which electric current flows across a memory cell from the source electrode to the drain electrode in a memory device. A drain to source programming order refers to an order of programming operations in which electric current flows across a memory cell from the drain electrode to the source electrode in a memory device. In some implementations, the programming order management component 113 identifies the programming order by retrieving the programming order from a metadata structure, e.g., a look-up table and/or a logical-to-physical (L2P) table. The programming order can be assigned to each wordline by the programming order management component 113 during an offline testing phase of the memory device. The programming order can be set according to identified high RBER clusterings among the wordlines of each die and/or based on an error count of each die. For example, the programming order can be set to avoid performing programming operations on sets of cells addressable by wordlines in areas of each die with high RBER clusterings and/or a high error count. In some implementations, in response to identifying the programming order, the programming order management component 113 can adjust a biasing scheme for the wordline to account for any "program disturb" effects that can occur when performing a programming operation on the set of cells addressable by the wordline. In some implementations, adjusting the biasing scheme for the wordline can include performing a GIDL seed programming scheme and/or a WSD programming scheme.

Further details with regards to the operations of the programming order management component 113 are described below.

Figure 2A:
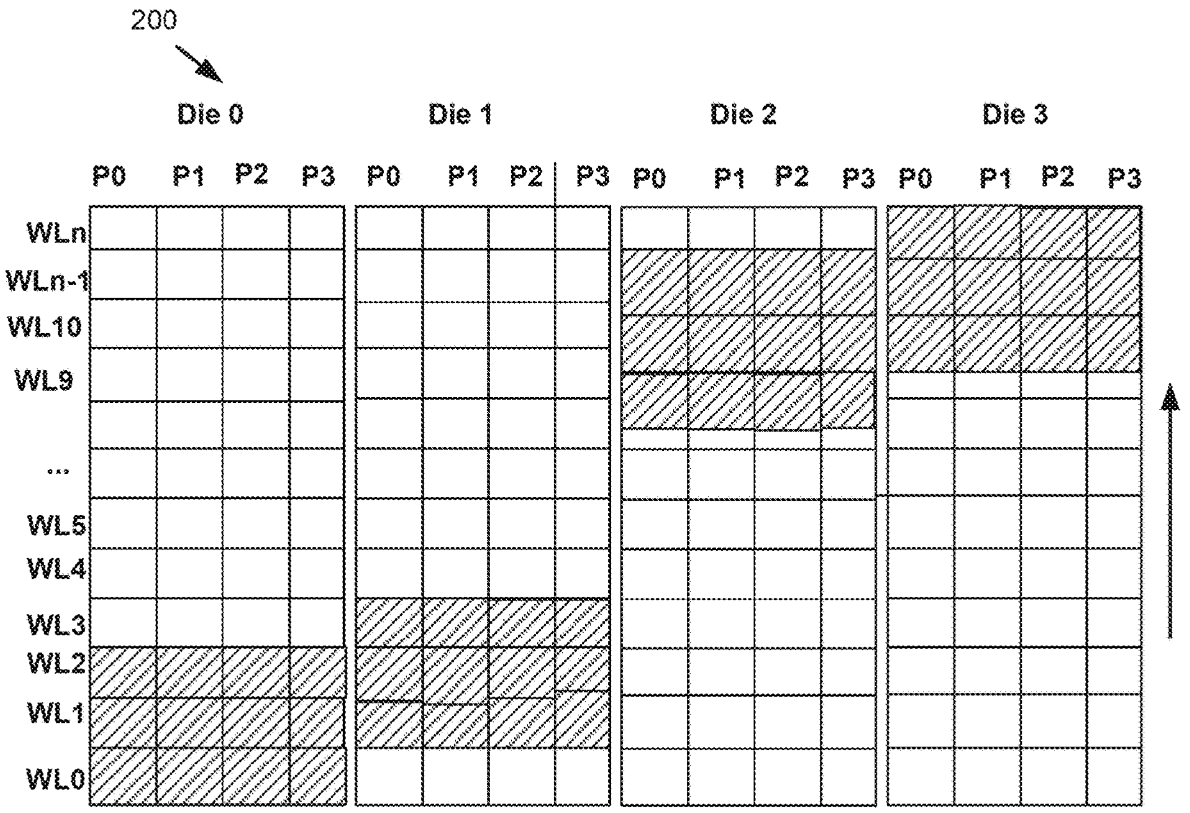
FIG. 2A is a block diagram illustrating an example set of wordlines located across a set of planes and die, in accordance with some embodiments of the present disclosure.

FIG. 2A is a block diagram illustrating an example set of wordlines located across a set of planes and die, in accordance with some embodiments of the present disclosure. As illustrated in FIG. 2A, a memory device (e.g., the memory device 130 of FIG. 1) can include 4 dice, such as die 0, die 1, die 2, and die 3. Each die can have a set of 4 planes, such as plane (P) 0, P1, P2, and P3. Each die can have a set of wordlines that are formed across the planes of the die. For example, die 0 can have a set of wordlines starting with WL0 (i.e., a wordline with an index value of 0) to WLn (i.e., a wordline with an index value of n). Die 1 can have a set of wordlines starting with WL0 (i.e., a wordline with an index value of 0) to WLn (i.e., a wordline with an index value of n). Die 2 can have a set of wordlines starting with WL0 (i.e., a wordline with an index value of 0) to WLn (i.e., a wordline with an index value of n). Die 3 can have a set of wordlines starting with WL0 (i.e., a wordline with an index value of 0) to WLn (i.e., a wordline with an index value of n).

In some implementations, a memory sub-system controller (e.g., the memory sub-system controller 115 of FIG. 1) can group similarly located blocks across planes of multiple dice into one block (i.e., a virtual block) to perform programming operations. Similarly located blocks can be blocks at similar physical locations (e.g., along the same wordline and/or blocks with the same or similar physical addresses) in each die. For example, as illustrated in FIG. 2A, the memory sub-system controller can group the blocks of the 4 planes of die 0 along WL0, the blocks of the 4 planes of die 1 along WL0, the blocks of the 4 planes of die 2 along WL0, and the blocks of the 4 planes of die 2 along WL0 into one virtual block. In the above example, the blocks of each die along the same wordline (i.e., WL0) are grouped into the virtual block in the above example. In some implementations, the memory sub-system controller can receive programming operations addressed to a logical block address of the virtual block (e.g., addressed to each block of the 4 planes of die 0, die 1, die 2, and die 3, along WL0).

The memory sub-system controller can receive one or more requests to perform programming operations. Each request can specify a logical address at which to perform each programming operation. The memory sub-system controller can use address translation metadata (e.g., an L2P table) to translate the logical address to a physical address. The physical address can pertain to a physical location of one or more memory cells formed by wordlines residing on a die. For example, as illustrated by FIG. 2A, the memory sub-system controller can perform a first programming operation (indicated with the shaded lines) on die 3 on a set of memory cells formed by WLn (i.e., a wordline with an index value of n). The memory sub-system controller can receive a request to perform a subsequent programming operation on die 3. To determine where to perform the subsequent programming operation on die 3, the memory sub-system controller can retrieve an order (also referred to herein as a "programming order") of performing the first programming operation (e.g., from metadata structure, such as a look-up table and/or L2P table), where the programming order is an order in which to perform programming operations in a die (e.g., from source to drain or drain to source). For example, the programming order can be a source to drain order, indicating that the order in which to perform each programming operation should be in a source to drain order. The programming order of the first programming operation can be predefined during an offline testing phase of the memory device and stored in a metadata structure, e.g., a look-up table and/or a logical-to-physical (L2P) table. The programming order can be assigned to each wordline by the memory sub-system controller and/or a firmware component during an offline testing phase of the memory device. The programming order can be set according to identified high RBER clusterings among the wordlines of each die and/or based on an error count of each die. For example, the programming order can be set to avoid performing programming operations on sets of cells addressable by wordlines in areas of each die with high RBER clusterings and/or a high error count. In response to identifying the programming order, the memory sub-system controller can identify the number of programming operations performed on the die referenced by the physical address (die 3) using the same programming order as the programming order used to perform the first programming operation (e.g., in a source to drain order). The memory sub-system controller can then determine whether the number of programming operations performed satisfies a threshold criterion. In some implementations, the threshold criterion specifies the maximum number of programming operations to be performed with respect to a die using the same programming order as the programming order used to perform the first programming operation (e.g., that the most recent programming operation is at the edge of the upper deck or lower deck and/or that the most recent programming operation is performed on a set of memory cells formed by a wordline physically located at the edge of the upper deck or lower deck of the die). In some embodiments, the threshold criterion can be determined during an offline testing phase of the memory device and stored in a metadata structure, such as a look-up table and/or L2P table, in association with a die of the memory device. The threshold criterion can be set according to identified high RBER clusterings among the wordlines of each die and/or based on an error count of each die. For example, the threshold criterion can be set to avoid performing programming operations on sets of cells addressable by wordlines in areas of each die with high RBER clusterings and/or a high error count.

For example, as illustrated in FIG. 2A, the most recent programming operation performed at die 3 is at WLn (e.g., the wordline physically located at the edge of the upper deck such that there is no other wordline higher than WLn on which to perform another programming operation). In response to determining that the number of programming operations satisfies the threshold criterion, the memory sub-system controller can utilize the same order (e.g., the same programming order) for performing the subsequent programming operation. For example, the programming order can be a drain to source programming order.

Figure 2B:
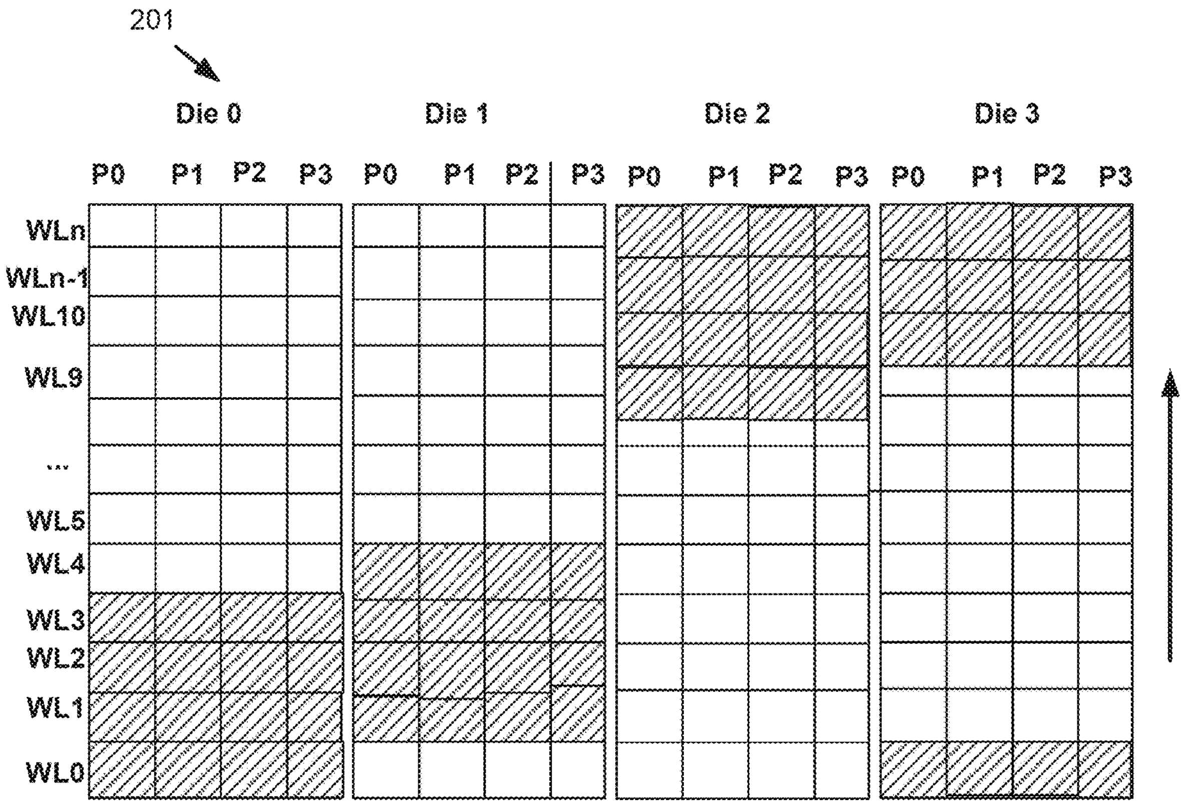
FIG. 2B is a block diagram illustrating an example set of wordlines located across a set of planes and die, in accordance with some embodiments of the present disclosure.

As illustrated in FIG. 2B, for performing the subsequent programming operation, the memory sub-system controller identifies the WL physically located next to the most recently programmed wordline. The memory sub-system controller can identify, using a physical address of the wordline with respect to the die, an index value of a wordline physically located next to the most recently programmed wordline (e.g., using the example above, WLn is the most recently programmed wordline using the drain to source programming order). The memory sub-system controller can identify the index value of WLn as n. The memory sub-system controller can identify, using the metadata structure described above, that WLn is the wordline physically located at the edge of the upper deck of die 3. In response, the memory sub-system controller can identify the wordline physically located at the edge of the lower deck of die 3, e.g., WL0 (e.g., a WL with an index value of 0).

In some embodiments, using die 2 of FIG. 2A as an illustrative example, the memory sub-system controller can identify the most recently programmed wordline as WLn−1 (e.g., where the WL has an index value of n−1). The memory sub-system controller can then perform the subsequent programming operation on a wordline with an index value that is closest in value to the index value of WLn−1 in the particular programming order (e.g., in the drain to source programming order). For example, the memory sub-system controller can identify a wordline with an index value of n (e.g., WLn) and perform the subsequent programming operation on a set of memory cells formed by WLn.

In some embodiments, the memory sub-system controller can perform programming operations in a particular programming order for certain dice of the memory device and in another programming order for other dice of the memory device. For example, the memory sub-system controller can perform programming operations in a source to drain programming order for die 0 and 1, and the memory sub-system controller can perform programming operations in a drain to source programming order for die 2 and 3. In some embodiments, any programming order can be used for any die of a memory device.

Figure 3:
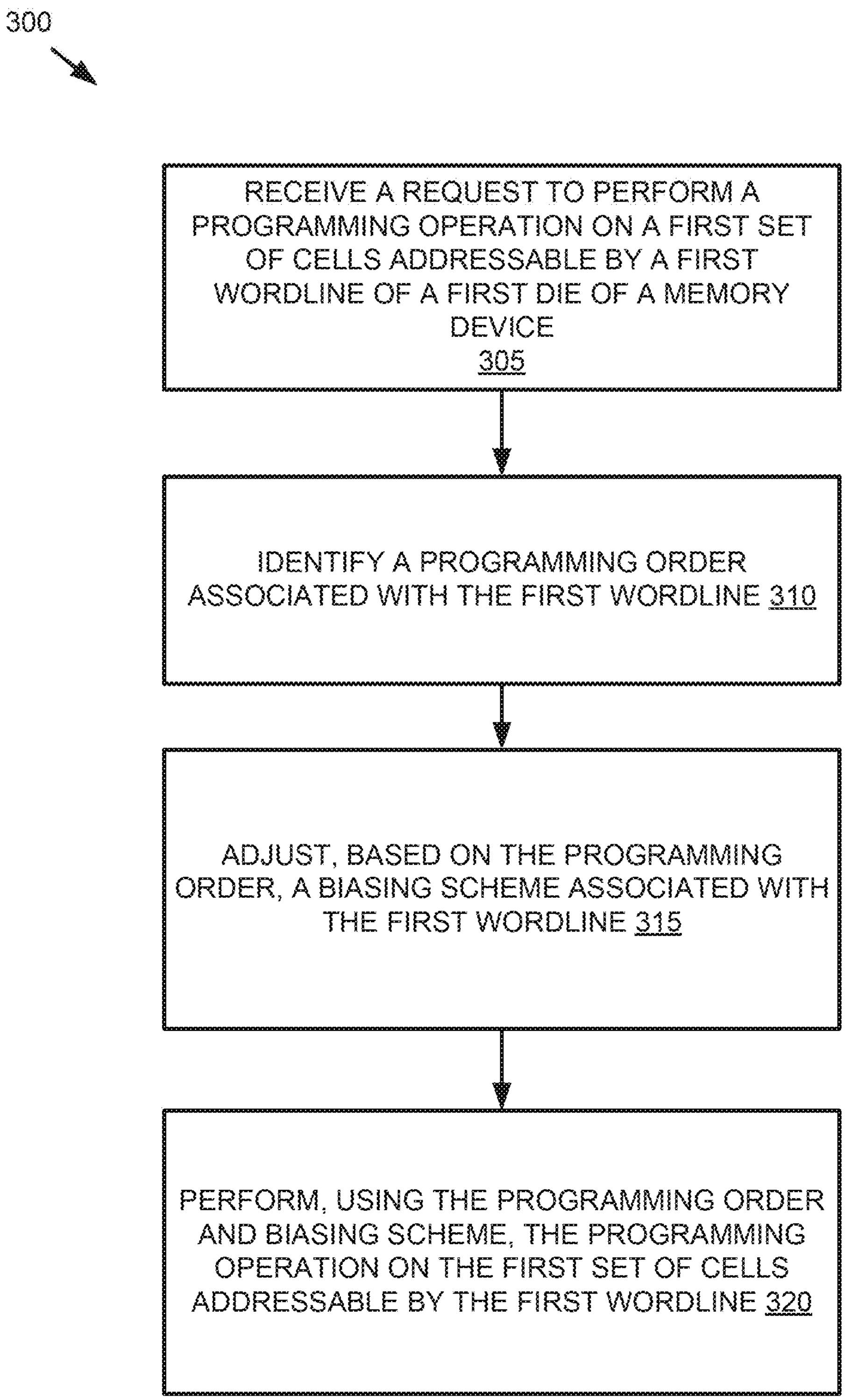
FIG. 3 is a flow diagram of an example method of managing an order of programming operations in a memory sub-system, in accordance with some embodiments of the present disclosure.

FIG. 3 is a flow diagram of an example method of managing the programming operation order in a memory sub-system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by programming order management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing logic receives a request to perform a programming operation (e.g., a first programming operation) on a set of cells formed by (e.g., addressable by) a wordline (e.g., a first wordline) of a die of a memory device (e.g., the memory device 130 of FIG. 1). In some implementations, the programming operation is a write operation. The processing logic can receive the request to perform the programming operation from a host system (e.g., the host system 120 of FIG. 1). In some embodiments, the request to perform the programming operation can specify one or more logical block addresses that each addresses a virtual block as described herein (e.g., a group of blocks across planes of multiple dice along similarly located wordlines). The processing logic can use address translation metadata (e.g., an L2P table) to translate each logical block address to a physical address. The physical address can pertain to a physical location of one or more memory cells formed by wordlines residing on a die.

At operation 310, the processing logic identifies a programming order of the first wordline. For example, the programming order can be a source to drain programming sequence or a drain to source programming sequence. A source to drain programming sequence refers to a sequence of programming operations in which electric current flows across a memory cell from the source electrode to the drain electrode in a memory device. A drain to source programming sequence refers to a sequence of programming operations in which electric current flows across a memory cell from the drain electrode to the source electrode in a memory device. In some implementations, the processing logic identifies the programming order by retrieving the programming order from a metadata structure, e.g., a look-up table and/or a logical-to-physical (L2P) table. The programming order can be assigned to each wordline by the memory sub-system controller and/or a firmware component during an offline testing phase of the memory device. The programming order can be set according to identified high RBER clusterings among the wordlines of each die and/or based on an error count of each die. For example, the programming order can be set to avoid performing programming operations on sets of cells addressable by wordlines in areas of each die with high RBER clusterings and/or a high error count.

At operation 315, the processing logic adjusts a biasing scheme of the first wordline. In some embodiments, the processing logic adjusts the biasing scheme based on the programming order of the wordline identified at operation 310. In some implementations, the processing logic can adjust the biasing scheme for the wordline to account for "program disturb" effects that can occur when performing the programming operation on the set of cells addressable by the wordline. In some implementations, adjusting the biasing scheme can include performing a GIDL seed programming scheme or a WSD programming scheme on the set of cells formed by first wordline, or other sets of cells addressable by other wordlines of a die of the memory device, as described herein.

At operation 320, the processing logic performs the programming operation on the set of cells of the block formed by the first wordline using the identified programming order and/or adjusted biasing scheme.

In some implementations, the processing logic can receive a request to perform another (e.g., a second or subsequent) programming operation on another wordline (e.g., a second wordline) on the same or another die of the memory device. In some implementations, the processing logic can identify an index value of the first wordline, where the index value is an identifier of a physical location of the first wordline. For example, the processing logic can retrieve the index value from a metadata structure. The metadata structure can include a set of entries. Each entry can store an index value of a wordline (e.g., an identifier of a physical location of the wordline. In some embodiments, the processing logic can identify the index value of the wordline by retrieving the index value from the metadata structure (e.g., by identifying the index value in an entry of the metadata structure). The processing logic can determine, based on the index value of the first wordline, whether the first wordline is located at an edge of a die. Each die of a memory device can include, in some embodiments, a first edge and a second edge, where the first edge and second edge are physically located at differing sides of the die. For example, using FIG. 2A as an illustrative example, WLn and WL0 are located at a first edge and second edge of each die. Determining that the first wordline is located at the edge of a die can include determining that the index value of the first wordline is a maximum or minimum value assigned to a wordline of the particular die. In some embodiments, the processing logic can identify a number of programming operations performed on the die in the same order as the first order in which the first order of programming operations is performed (e.g., in a source to drain order). The processing logic can determine whether the number of programming operations performed satisfies a threshold criterion. In some implementations, satisfying the threshold criterion can include determining that a maximum number of programming operations to be performed in the particular programming order has been performed (e.g., that the most recent programming operation performed in the particular programming order is at the edge of the upper deck or lower deck of the memory device or that the most recent programming operation performed in the particular programming order is performed on a set of memory cells formed by a wordline physically located at the edge of the upper deck or lower deck of the memory device). In some embodiments, the threshold criterion can be determined during an offline testing phase of the memory device and stored in a look-up table and/or L2P table in association with a die of the memory device. In response to determining that the number of programming operations performed satisfies the threshold criterion, the processing logic can identify the second wordline. The processing logic can perform the second programming operation on a second set of cells addressable by the second wordline using the same programming order as the programming order associated with the first wordline as identified at operation 310.

For example, using FIGS. 2A-2B as an illustrative example, the most recent programming operation performed at die 3 is at WLn (e.g., the wordline physically located at the edge of the upper deck, such that there is no other wordline higher than WLn on which to perform another programming operation). In response to determining that the number of programming operations satisfies the threshold criterion, the processing logic can identify the second wordline on which to perform the subsequent programming operation. For example, the processing logic can identify, using the metadata structure described herein, that WLn is the wordline physically located at the edge of the upper deck of die 3. In response, the processing logic can identify the wordline physically located at the edge of the lower deck of die 3, e.g., WL0 (e.g., a WL with an index value of 0). The processing logic can perform the subsequent programming operation on sets of memory cells formed by WL0 in the same order used to perform the first programming operation described above (e.g., in the drain to source programming order).

Figure 4:
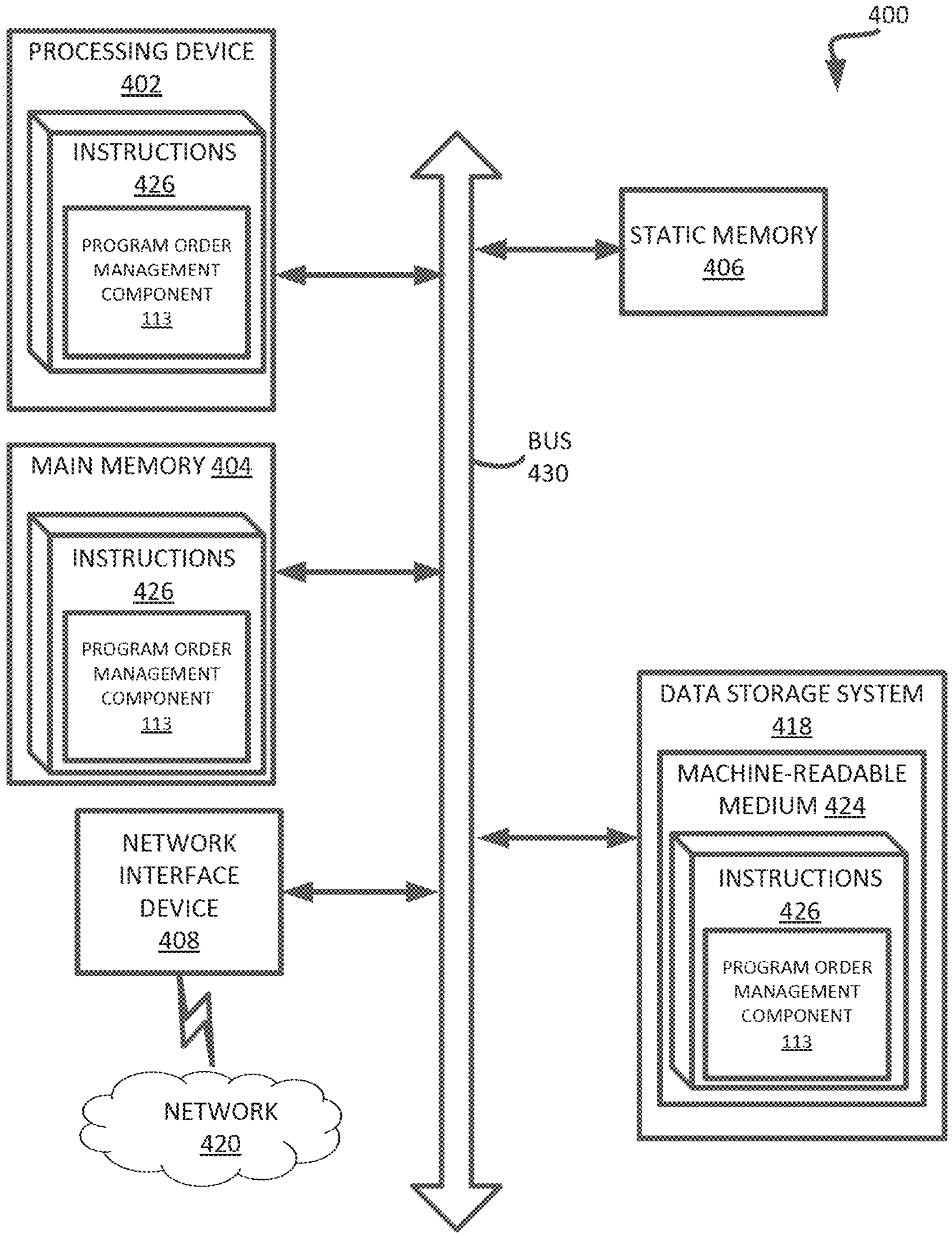
FIG. 4 is a block diagram of an example computer system in which embodiments of the present disclosure can operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the programming order management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to the programming order management component 113 of FIG. 1. While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
- a memory device; and
- a processing device, operatively coupled with the memory device, to perform operations comprising:
  - receiving a request to perform a programming operation on a first set of cells addressable by a first wordline of a first die of the memory device;
  - identifying a programming order associated with the first wordline, wherein the programming order is one of: a source-to-drain programming order or a drain-to-source programming order;
  - adjusting, based on the programming order, a biasing scheme associated with the first wordline, by performing a wordline stagger discharge (WSD) programming scheme on the first set of cells; and
  - performing, using the programming order and the biasing scheme, the programming operation on the first set of cells addressable by the first wordline.

2. The system of claim 1, wherein the operations further comprise:
- identifying an index value of the first wordline, wherein the index value corresponds to an identifier of a physical location of the first wordline;
- determining, based on the index value of the first wordline, that the first wordline is located at a first edge of the first die;
- in response to determining that the first wordline is located at the first edge of the first die, identifying a second wordline of the first die, wherein the second wordline is located at a second edge of the first die, wherein the first edge and the second edge of the first die are physically located at differing sides of the first die; and
- performing a second programming operation on a second set of cells addressable by the second wordline, wherein the second programming operation is performed using a same programming order as the programming order associated with the first wordline.

3. The system of claim 1, wherein the operations further comprise:

identifying a number of programming operations performed on the first die of the memory device, wherein each programming operation of the number of programming operations is associated with a same programming order as the programming order associated with the first wordline; and determining that the number of programming operations performed on the first die of the memory device satisfies a threshold criterion.

4. The system of claim 3, wherein the operations further comprise:

in response to determining that the number of programming operations performed on the first die satisfies the threshold criterion, identifying a second wordline of the first die, wherein the second wordline is located at a second edge of the first die, wherein the first edge and the second edge of the first die are physically located at differing sides of the first die; and performing a second programming operation on a second set of cells addressable by the second wordline, wherein the second programming operation is performed using a same programming order as the programming order associated with the first wordline.

5. The system of claim 1, wherein identifying the programming order associated with the first wordline comprises:

retrieving, from an entry of a metadata structure, the programming order associated with the first wordline, wherein the metadata structure comprises a plurality of entries, each entry associating an index value of a wordline of the memory device with a programming order.

6. The system of claim 1, wherein adjusting the biasing scheme comprises:

performing a gate-induced drain leakage (GIDL) seed programming scheme on the first set of cells addressable by the first wordline.

7. A method comprising:

receiving a request to perform a programming operation on a first set of cells addressable by a first wordline of a first die of a memory device;

identifying a programming order associated with the first wordline, wherein the programming order is one of: a source-to-drain programming order or a drain-to-source programming order;

adjusting, based on the programming order, a biasing scheme associated with the first wordline, by performing a wordline stagger discharge (WSD) programming scheme on the first set of cells; and performing, using the programming order and the biasing scheme, the programming operation on the first set of cells addressable by the first wordline.

8. The method of claim 7, further comprising:

identifying an index value of the first wordline, wherein the index value corresponds to an identifier of a physical location of the first wordline;

determining, based on the index value of the first wordline, that the first wordline is located at a first edge of the first die;

in response to determining that the first wordline is located at the first edge of the first die, identifying a second wordline of the first die, wherein the second wordline is located at a second edge of the first die, wherein the first edge and the second edge of the first die are physically located at differing sides of the first die; and performing a second programming operation on a second set of cells addressable by the second wordline, wherein the second programming operation is performed using a same programming order as the programming order associated with the first wordline.

9. The method of claim 7, further comprising:

identifying a number of programming operations performed on the first die of the memory device, wherein each programming operation of the number of programming operations is associated with a same programming order as the programming order associated with the first wordline; and determining that the number of programming operations performed on the first die of the memory device satisfies a threshold criterion.

10. The method of claim 9, further comprising:

in response to determining that the number of programming operations performed on the first die satisfies the threshold criterion, identifying a second wordline of the first die, wherein the second wordline is located at a second edge of the first die, wherein the first edge and the second edge of the first die are physically located at differing sides of the first die; and performing a second programming operation on a second set of cells addressable by the second wordline, wherein the second programming operation is performed using a same programming order as the programming order associated with the first wordline.

11. The method of claim 7, wherein identifying the programming order associated with the first wordline comprises:

retrieving, from an entry of a metadata structure, the programming order associated with the first wordline, wherein the metadata structure comprises a plurality of entries, each entry associating an index value of a wordline of the memory device with a programming order.

12. The method of claim 7, wherein adjusting the biasing scheme comprises:

performing a gate-induced drain leakage (GIDL) seed programming scheme on the first set of cells addressable by the first wordline.

13. A non-transitory computer-readable storage medium comprising instructions that, when executed by a processing device, cause the processing device to perform operations comprising:

receiving a request to perform a programming operation on a first set of cells addressable by a first wordline of a first die of a memory device;

identifying a programming order associated with the first wordline, wherein the programming order is one of: a source-to-drain programming order or a drain-to-source programming order;

adjusting, based on the programming order, a biasing scheme associated with the first wordline, by performing a wordline stagger discharge (WSD) programming scheme on the first set of cells; and performing, using the programming order and the biasing scheme, the programming operation on the first set of cells addressable by the first wordline.

14. The non-transitory computer-readable storage medium of claim 13, wherein the operations further comprise:

identifying an index value of the first wordline, wherein the index value corresponds to an identifier of a physical location of the first wordline;

determining, based on the index value of the first wordline, that the first wordline is located at a first edge of the first die; and in response to determining that the first wordline is located at the first edge of the first die, identifying a second wordline of the first die, wherein the second wordline is located at a second edge of the first die, wherein the first edge and the second edge of the first die are physically located at differing sides of the first die; and performing a second programming operation on a second set of cells addressable by the second wordline, wherein the second programming operation is performed using a same programming order as the programming order associated with the first wordline.

15. The non-transitory computer-readable storage medium of claim 13, wherein the operations further comprise:

identifying a number of programming operations performed on the first die of the memory device, wherein each programming operation of the number of programming operations is associated with a same programming order as the programming order associated with the first wordline; and determining that the number of programming operations performed on the first die of the memory device satisfies a threshold criterion.

16. The non-transitory computer-readable storage medium of claim 15, wherein the operations further comprise:

in response to determining that the number of programming operations performed on the first die satisfies the threshold criterion, identifying a second wordline of the first die, wherein the second wordline is located at a second edge of the first die, wherein the first edge and the second edge of the first die are physically located at differing sides of the first die; and performing a second programming operation on a second set of cells addressable by the second wordline, wherein the second programming operation is performed using a same programming order as the programming order associated with the first wordline.

17. The non-transitory computer-readable storage medium of claim 13, wherein identifying the programming order associated with the first wordline further comprises:

retrieving, from an entry of a metadata structure, the programming order associated with the first wordline, wherein the metadata structure comprises a plurality of entries, each entry associating an index value of a wordline of the memory device with a programming order.

18. The non-transitory computer-readable storage medium of claim 13, wherein adjusting the biasing scheme further comprises:

performing a gate-induced drain leakage (GIDL) seed programming scheme on the first set of cells addressable by the first wordline.

* * * * *